(12) United States Patent  
McCarthy et al.

(10) Patent No.: US 7,476,014 B1
(45) Date of Patent: Jan. 13, 2009

(54) VEHICLE HEADLAMP UNIT

(75) Inventors: Steven Dennis McCarthy, Farmington Hills, MI (US); Scott William Nicol, Ontario (CA); Chris Greco, Livonia, MI (US); John Kallio, Redford, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/840,451

(22) Filed: Aug. 17, 2007

(51) Int. Cl.
*H01R 13/625* (2006.01)
(52) U.S. Cl. ........................... 362/519; 362/548
(58) Field of Classification Search ............. 362/548, 362/549
See application file for complete search history.

(56) References Cited

U.S. PATENT DOCUMENTS 6,082,883 A * 7/2000 Tatsumi et al. ............. 362/548
6,406,173 B1 * 6/2002 Serizawa et al. ............ 362/545
7,204,711 B2 * 4/2007 Garcia et al. ............... 439/336

* cited by examiner

*Primary Examiner*—Anabel M Ton
(74) *Attorney, Agent, or Firm*—Brinks Hofer Gilson & Lione

(57) ABSTRACT

A vehicle headlamp unit that is configured for use with either a halogen lamp or a high intensity discharge lamp. The headlamp unit includes a housing within which a reflector is located for reflecting light from the headlamp unit. A lamp is supported within the reflector and a lamp socket is electrically connected to the lamp. The lamp socket including a wire harness receptacle having a first configuration that is configured to matingly engage the wire harness connector. A secondary receptacle is also connected to the housing. The secondary receptacle has a second configuration that at least partially duplicates the first configuration and is configured to matingly engage the wire harness connector. Accordingly, both the wire harness receptacle and the secondary receptacle are configured to alternately receive and matingly engage the wire harness connector.

10 Claims, 4 Drawing Sheets

VEHICLE HEADLAMP UNIT

BACKGROUND

1. Field of Invention

The present invention relates generally to vehicle headlamps and, more particularly, to a vehicle headlamp unit having an electrical connection that is compatible with both halogen and high intensity discharge (HID) lamps.

2. Related Technology

Different vehicle headlamp systems use different types of lamps. While they are most commonly equipped with halogen lamps, recently there has been a trend towards adopting high intensity discharge (HID) lamps. In a halogen lamp an electric current passes through a high-resistance tungsten filament which generates light. In an HID lamp, instead of a filament, an arc is created between a pair of electrodes, which excites a gas (commonly xenon) inside the lamp that vaporizes metallic salts. These metallic salts help sustain the arc and provide a consistent lamp intensity. Compared to HID lamps, halogen lamps operate at a low power voltage (12 or 24 volts) and can directly use the voltage from the vehicle power. HID lamps operate at much higher voltage, approximately 20 kilovolts (kV). Thus, a separate lighting circuit is required to generate the high voltage for lighting the HID lamp.

HID headlamp systems are attractive to automotive manufacturers because of their longer lifespan, better durability, and greater performance and power efficiency. Despite the numerous advantages of HID lamps, manufacturers have not entirely replaced halogen lamps with HID lamps because they are expensive compared, to halogen lamps. and they have a tendency to cause more discomfort glare for oncoming drivers. Accordingly, a vehicle may be designed to alternately accommodate halogen and HID headlamps, depending on which is desired by the end consumer. A unique wiring harness, for supplying power from the vehicle to the lamp, is currently required for each version of the headlamp due to the difference in design and power supply requirements in halogen and HID headlamps. This further increases cost and complexity in the internal structure of the vehicle by requiring different wire harness designs and components for each version.

SUMMARY

In overcoming the enumerated drawbacks and other limitations of the related art, the present invention provides a vehicle headlamp unit having an electrical connection that is compatible with either halogen or HID lamps.

In one aspect of the invention, a vehicle headlamp comprises a lamp housing and a lens; the lens being mounted in an opening in the front of the lamp housing. A reflector is also mounted in the housing and a lamp is centrally located in the reflector. The lamp itself may be either a halogen lamp or a discharge lamp, comprising a bulb and a base.

In a halogen headlamp, the lamp comprises electrical contacts which connect to electrical leads of the lamp base. The lamp socket comprises a lamp socket cavity including a closed end having apertures and an open end. The closed end and the open end are defined by first and second ellipsoidal walls, respectively, the circumference of the second ellipsoidal wall being greater than the circumference of the first ellipsoidal wall. The lamp socket comprises wire leads which form an electrical connection with electrical contacts to light the bulb. The wire leads are inserted through the apertures in the closed end of the lamp socket cavity and extend to the open end of the lamp socket cavity. A wire harness for supplying power from a vehicle power supply connects into the lamp socket cavity and forms an electrical connection with the wire leads. The lamp housing cavity is molded to correspond with the shape of the lamp socket cavity. The lamp housing cavity remains unoccupied in a halogen headlamp.

In a discharge headlamp, where high voltage is required to light the discharge bulb, a lighting circuit unit is required for supplying a high voltage to the electrical connection device of a lamp socket. The lighting circuit unit is contained within the housing and receives power from a power supply cord. The power supply cord comprises a cord connector which passes through the lamp housing cavity of the lamp housing. The lamp housing cavity is molded to correspond with the shape of the lamp socket cavity of a halogen lamp. Accordingly, the lamp housing cavity includes a closed end with apertures and an open end. The closed end and the open end are defined by first and second ellipsoidal walls, respectively, the circumference of the second ellipsoidal wall being greater than the circumference of the first ellipsoidal wall. The cord connector having metal leads passes through the lamp housing cavity, the metal leads being inserted through the apertures in the closed end and extending to the open end of the lamp housing cavity. Thus, the geometry of the lamp socket cavity of the halogen lamp is integral to the lamp housing cavity containing the cord connector metal leads. Hence, the wire harness that is configured to connect to the lamp socket cavity of the halogen lamp for supplying power from a vehicle power supply is compatible with the lamp housing cavity. Accordingly, in a discharge headlamp, where a cord connector passes through the lamp housing cavity, the wire harness connects into the lamp housing cavity and forms an electrical connection with the metal leads of the connector.

Once the lighting circuit unit receives power from the wire harness through the power supply cord, two high voltage power supply cords supply the high voltage from the lighting circuit to the lamp socket. The electrical connection device in the lamp socket then supplies the power to ignite the discharge bulb.

In at least one embodiment, the vehicle headlamp unit comprises a lamp housing having a front end and a rear end and openings in both the front and rear ends. A lens is mounted in the front end opening. A reflector is mounted within the lamp housing and a lamp is mounted on the reflector. The lamp is one of a first lamp or a second lamp and comprises a bulb, a lamp base, and a lamp socket. The lamp socket includes an electrical connection device. The lamp socket of a first lamp includes a lamp socket body for receiving the lamp base and a lamp socket cavity for receiving a vehicle power supply. A lamp housing cavity is molded into the lamp housing, projecting from the rear end of the lamp housing. The lamp housing cavity is configured to receive a vehicle power supply. The geometry of the lamp housing cavity is designed to correspond with the geometry of the lamp socket cavity of the lamp socket of a first lamp.

The vehicle headlamp unit may comprise a first lamp or a second lamp, wherein the first lamp is a halogen lamp and the second lamp is a discharge lamp.

In another embodiment, the geometry of the lamp socket cavity of the lamp socket of a first lamp includes a closed end with at least one aperture and an open end for receiving a vehicle power supply. The closed end and the open end are defined by a first and second ellipsoidal wall, respectively, wherein the circumference of the second ellipsoidal wall is greater than the circumference of the first ellipsoidal wall.

In another embodiment, the vehicle headlamp includes at least one electrical contact having a top end and a bottom end and the lamp base of a first lamp comprises at least one electrical lead. The at least one electrical contact is received in the lamp socket body having a front end and a rear end. The top end of the at least one electrical contact is configured to engage the at least one electrical lead of the lamp base at the front end of the lamp socket body and the bottom end of the at least one electrical contact extends from the rear end of the lamp socket body.

In another embodiment, the lamp socket of a first lamp comprises at least one wire lead having a top end and a bottom end, wherein the top end is configured to form a first electrical connection with the at least one electrical contact extending from the rear of the lamp socket body, and wherein the bottom end of the at least one wire lead is inserted through the at least one aperture in the closed end of the lamp socket cavity and configured to form a second electrical connection with a vehicle power supply.

In another embodiment, wherein the vehicle headlamp comprises a first lamp, a harness for supplying power from a vehicle power supply to the first lamp connects into the open end of the lamp socket cavity, forming a second electrical connection with the at least one wire lead. The first electrical connection between the at least one wire lead and the at least one electrical contact then supplies power to light the lamp bulb.

In another embodiment, wherein the vehicle headlamp comprises a second lamp, a lighting circuit unit is disposed within the lamp housing for providing a first electrical connection to the lamp socket of the lamp. A first power supply cord for providing a second electrical connection to the lighting circuit unit is positioned between the lighting circuit unit and the rear end of the lamp housing. The first power supply cord includes a first cord connector designed to pass through the lamp housing cavity molded into the rear end of the lamp housing, wherein the first cord connector includes metal leads, the metal leads being configured to connect to a vehicle power supply and form the second electrical connection.

A second power supply cord for providing the first electrical connection to the lamp is positioned between the lighting circuit unit and the lamp socket of the lamp for supplying power from the lighting circuit unit to the electrical connection device of the lamp socket. A harness for supplying power from a vehicle power supply to the first power supply cord connects to the first cord connector through the lamp housing cavity at the rear end of the lamp housing. The geometry of the lamp housing cavity is configured to correspond with the geometry of the lamp socket cavity of the lamp socket of a first lamp. Thus, the harness is compatible with both the lamp socket cavity of a first lamp and the lamp housing cavity molded into the lamp housing. A back cover may be mounted in the opening of the rear end of the lamp housing.

In another aspect, the vehicle headlamp unit comprises a lamp housing having a front end and a rear end and openings in both the front and rear ends. A lens is mounted in the front end opening. A reflector is mounted within the lamp housing and a lamp is mounted on the reflector. The lamp is one of a first lamp or a second lamp and comprises a bulb, a lamp base, and a lamp socket. The lamp socket includes an electrical connection device. The lamp socket of a first lamp includes a lamp socket body for receiving the lamp base and a lamp socket cavity for receiving a vehicle power supply. A lamp housing cavity is molded into the lamp housing, projecting from the rear end of the lamp housing. The lamp housing cavity is configured to receive a vehicle power supply. The geometry of the lamp housing cavity is designed to correspond with the geometry of the lamp socket cavity of the lamp socket of a first lamp. A harness provides a first electrical connection from a vehicle power supply to light the lamp. The harness is compatible with both a vehicle headlamp unit comprising a first lamp and a vehicle headlamp unit comprising a second lamp. Where the vehicle headlamp comprises a first lamp, the harness is configured to connect in the lamp socket cavity of the lamp socket of the first lamp. Where the vehicle headlamp comprises a second lamp, the harness is configured to connect in the lamp housing cavity molded into the lamp housing.

The vehicle headlamp unit may comprise a first lamp or a second lamp, wherein the first lamp is a halogen lamp and the second lamp is a discharge lamp.

In another embodiment, the geometry of the lamp socket cavity of the lamp socket of a first lamp includes a closed end with at least one aperture and an open end for receiving a vehicle power supply. The closed end and the open end are defined by a first and second ellipsoidal wall, respectively, wherein the circumference of the second ellipsoidal wall is greater than the circumference of the first ellipsoidal wall.

In another embodiment, the vehicle headlamp includes at least one electrical contact having a top end and a bottom end and the lamp base of a first lamp comprises at least one electrical lead. The at least one electrical contact is received in the lamp socket body having a front end and a rear end. The top end of the at least one electrical contact is configured to engage the at least one electrical lead of the lamp base at the front end of the lamp socket body and the bottom end of the at least one electrical contact extends from the rear end of the lamp socket body.

In another embodiment, the lamp socket of a first lamp comprises at least one wire lead having a top end and a bottom end, wherein the top end is configured to form a second electrical connection with the at least one electrical contact extending from the rear of the lamp socket body, and wherein the bottom end of the at least one wire lead is inserted through the at least one aperture in the closed end of the lamp socket cavity and configured to form a first electrical connection with the harness.

In another embodiment, wherein the vehicle headlamp comprises a second lamp, a lighting circuit unit is disposed within the lamp housing for providing a second electrical connection to the lamp. A first power supply cord for providing a second electrical connection to the lighting circuit unit is positioned between the lighting circuit unit and the rear end of the lamp housing. The first power supply cord includes a first cord connector designed to pass through the lamp housing cavity molded into the rear end of the lamp housing, the first cord connector having metal leads, the metal leads being configured to connect to the harness and form the first electrical connection. A second power supply cord for providing the second electrical connection to the lamp is positioned between the lighting circuit unit and the lamp socket of the lamp for supplying power from the lighting circuit unit to the electrical connection device of the lamp socket. A back cover may be mounted in the opening of the rear end of the lamp housing.

The geometry of the lamp housing cavity is configured to correspond with the geometry of the lamp socket cavity of the lamp socket of a first lamp. Thus, the lamp housing cavity comprises a closed end having apertures and an open end, the closed end and the open end being defined by first and second ellipsoidal walls, the circumference of the second ellipsoidal wall being greater than the circumference of the first ellipsoidal wall. Analogous to the wire leads of the lamp socket of a first lamp which pass through the apertures in the closed end of the lamp socket cavity, the metal leads of the cord connector are inserted through apertures in the closed end of the lamp housing cavity. Thus, the harness is compatible with both a first lamp headlamp and a second lamp headlamp, the harness being configured to form an electrical connection with the wire leads of the lamp socket cavity of a first lamp, and alternatively, with the metal leads of the cord connector in the lamp housing cavity in a second lamp headlamp.

DETAILED DESCRIPTION

Figure 1:
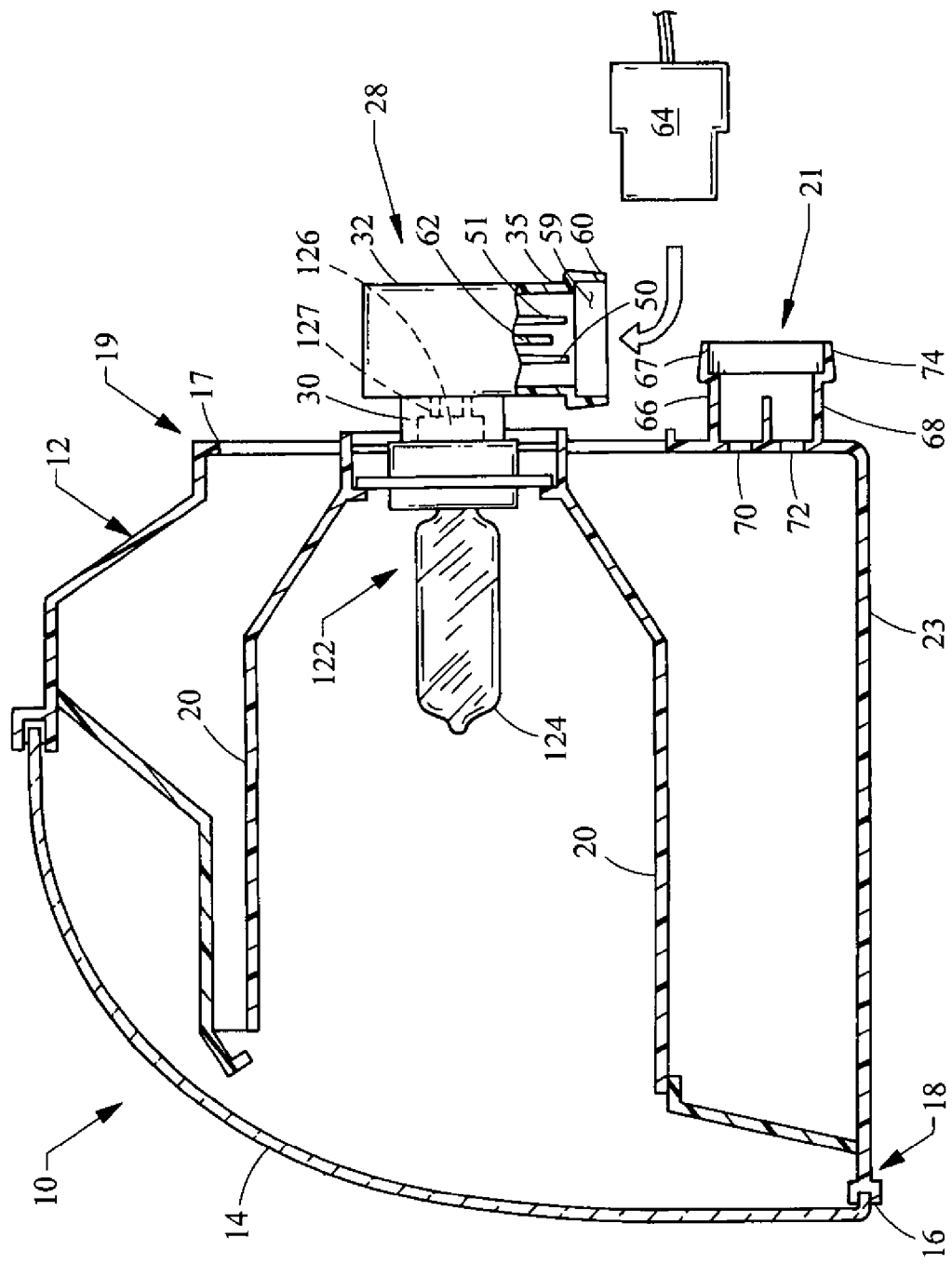
FIG. 1 is a cross-sectional view of a vehicle headlamp embodying the principles of the present invention and employing a halogen lamp.

The following description of the preferred embodiments of the invention is not intended to limit the scope of the invention to these preferred embodiments, but rather to enable any person skilled in the art to make and use the invention.

Turning now to the figures, depicted therein is a cross-sectional view of a vehicle headlamp assembly or unit 10 embodying the principles of the present invention. The vehicle headlamp 10 includes a headlamp housing 12 having an opening 16 in the front end and an opening 17 in the rear end thereof. A lens 14 is mounted in the opening 16 and a reflector 20 is supported within the housing 12. Centrally located within the reflector 20 is a lamp. As further discussed below, the lamp may be either a halogen lamp or an HID lamp since the headlamp 10 is designed to accommodate either variety.

The lamp includes a bulb and a base. As shown in FIG. 1, the base 126 includes a pair of contacts 127 extending therefrom. It will be appreciated, that the base 126 is being generically presented and the specific configure of the base 126 will depend on the particular type and variety of lamp being used in the headlamp 10.

Figure 3:
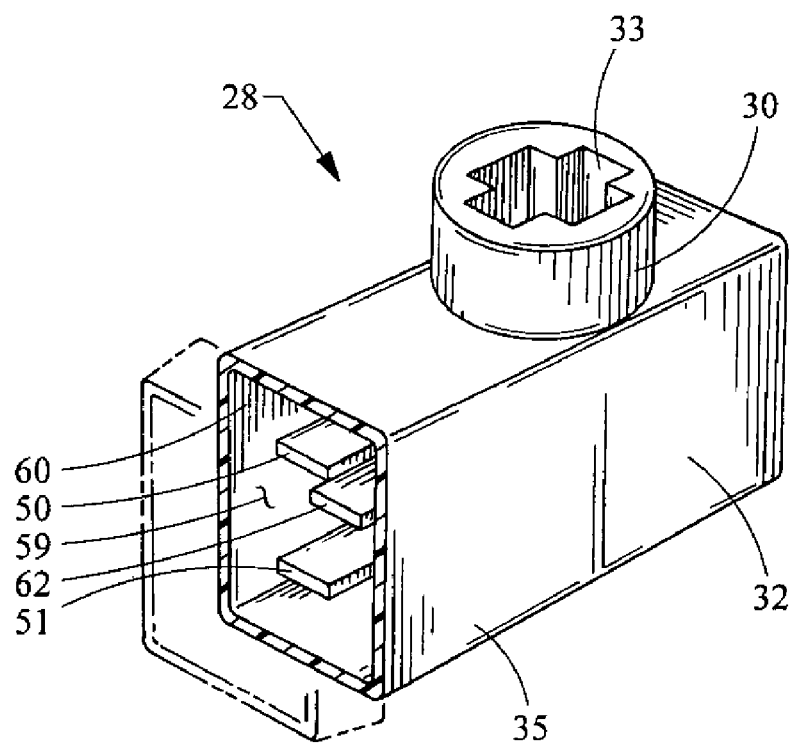
FIG. 3 is a perspective view, with portion cut away, of a lamp socket for a halogen lamp.

As noted above and as will be seen from the discussion which follows, the headlamp 10 is designed to accept either halogen lamps or HID lamps and specific features are formed in the headlamp 10 to achieve this goal. As such, a secondary receptacle 21 is connected to the housing 12, such as being formed in a wall 23 of the housing 12. As seen in FIG. 1, the headlamp 10 is employed with a halogen lamp 22. In FIG. 3, the headlamp 10 is shown employing an HID lamp 22.

Further, referring to FIG. 1, the headlamp 10 is illustrated therein employing a halogen lamp 122 having a bulb 124 and a base 126. Coupled to the base 126 of the halogen lamp 122 is a halogen lamp socket 28. The lamp socket 28 connects directly to the base 126 of the halogen lamp 122. Accordingly, the lamp socket 128 includes a lamp receptacle 30 having an appropriately shaped receptacle cavity 33 defined therein (as seen in FIG. 3). The cavity 33 is correspondingly shaped to receive the base 126. As shown in FIG. 3, the cross-sectional shape of the receptacle cavity 33 corresponds to the cross-sectional shape of the lamp base 126 and receives the lamp base 126 in a press fit engagement. If the lamp base included terminals projecting therefrom (as shown in FIG. 1), the receptacle cavity 33 would appropriately include features for electrically engaging the terminals 127. The lamp socket 28 further includes a socket body 32 to which the lamp receptacle 30 may be configured for snap fit engagement. Alternatively, the lamp receptacle 30 and socket body 32 may be unitarily formed with each other. The snap engagement, however, allows for the socket body 32 to accept lamps 122 with alternative base 126 configurations by merely coupling it with an appropriately configured lamp receptacle 30.

The lamp socket 28 further includes a wire harness receptacle 35 configured to receive a wire harness connector 64 coupled to the power supply of the vehicle (not shown). The connector 64 is appropriately shaped to engage and be retained with the wiring harness receptacle 35 and also include contacts therein to engage electrical contact terminals 50 and 51 within the wiring harness receptacle 35, which are in turn connected to the contacts 127 of the halogen lamp 122. While the wire harness receptacle 35 and the wiring harness connector 64 may have a variety of configurations, they are illustrated respectively as female and male portions shaped so as to matingly engage one another via the end 65 of the connector 64 being received within the cavity 59 defined within a side wall 60 of the receptacle 35. Additionally, as illustrated, the receptacle 35 is provided with a locating feature 62 in the form of an elongated finger. The locating feature 62 may be utilized to ensure proper orientation of the connector 64 within the receptacle 35. With the wiring harness connector 64 engaged with the wiring harness receptacle 35, an electrical connection is made between the power supply system of the vehicle and the halogen lamp 122. Accordingly, the halogen lamp 122 may be powered on as required during operation of the vehicle.

Figure 4:
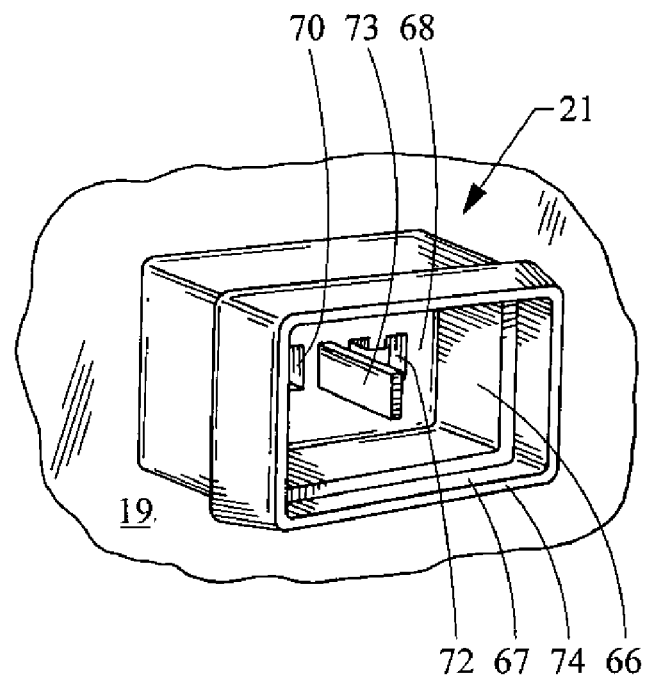
FIG. 4 is a perspective view of the duplicate connection see in FIGS. 1 and 2.
Figure 5:
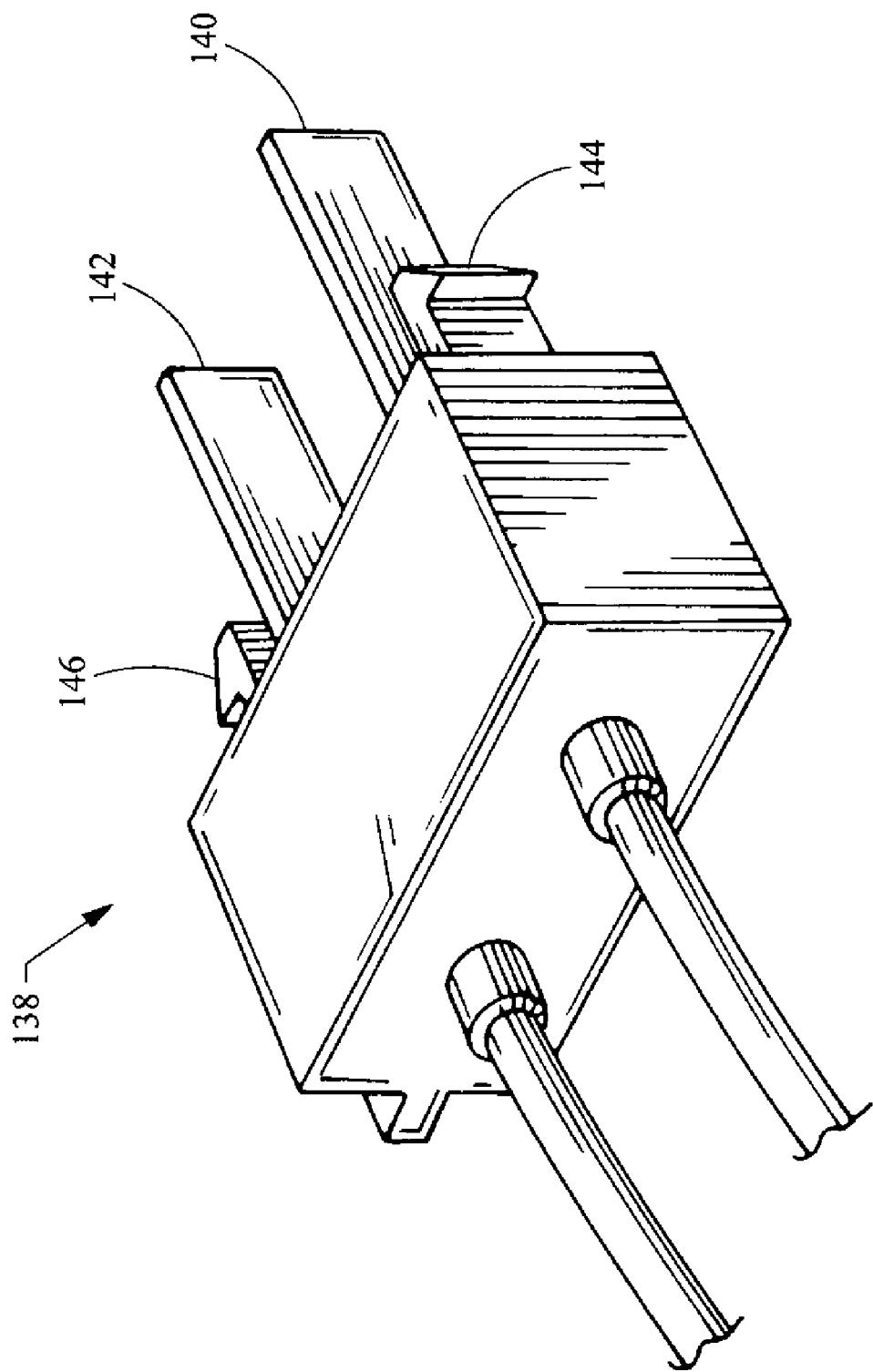
FIG. 5 is a perspective view of a wiring harness connector.

FIG. 4 is a perspective view of the secondary receptacle 21, projecting from the rear end 19 of the wall 23 of the lamp housing 12. The secondary receptacle 21 is shaped so as to correspond and have the same shape as the wire harness receptacle 35 of the socket body 32. As with receptacle 35, the secondary receptacle 21 is appropriately shaped to receive and engage the wire harness connector 64. The secondary receptacle 21 includes a closed end 68, having apertures 70 and 72 therethrough, and an open end 74 for receiving the connector 64 of the vehicle power supply. Centrally located between the apertures 70 and 72 is a locating feature 73, which serves the same purpose as the locating feature 62 of the wire harness receptacle 35.

As shown in FIG. 1, when used with a halogen lamp 122, the voltage is directly transmitted from the power supply of a vehicle to illuminate the bulb 124. The wire harness 64 connects to the wire harness receptacle 35 of lamp socket 28. Notably, the secondary receptacle 21 of lamp housing 12 is left unoccupied.

Figure 2:
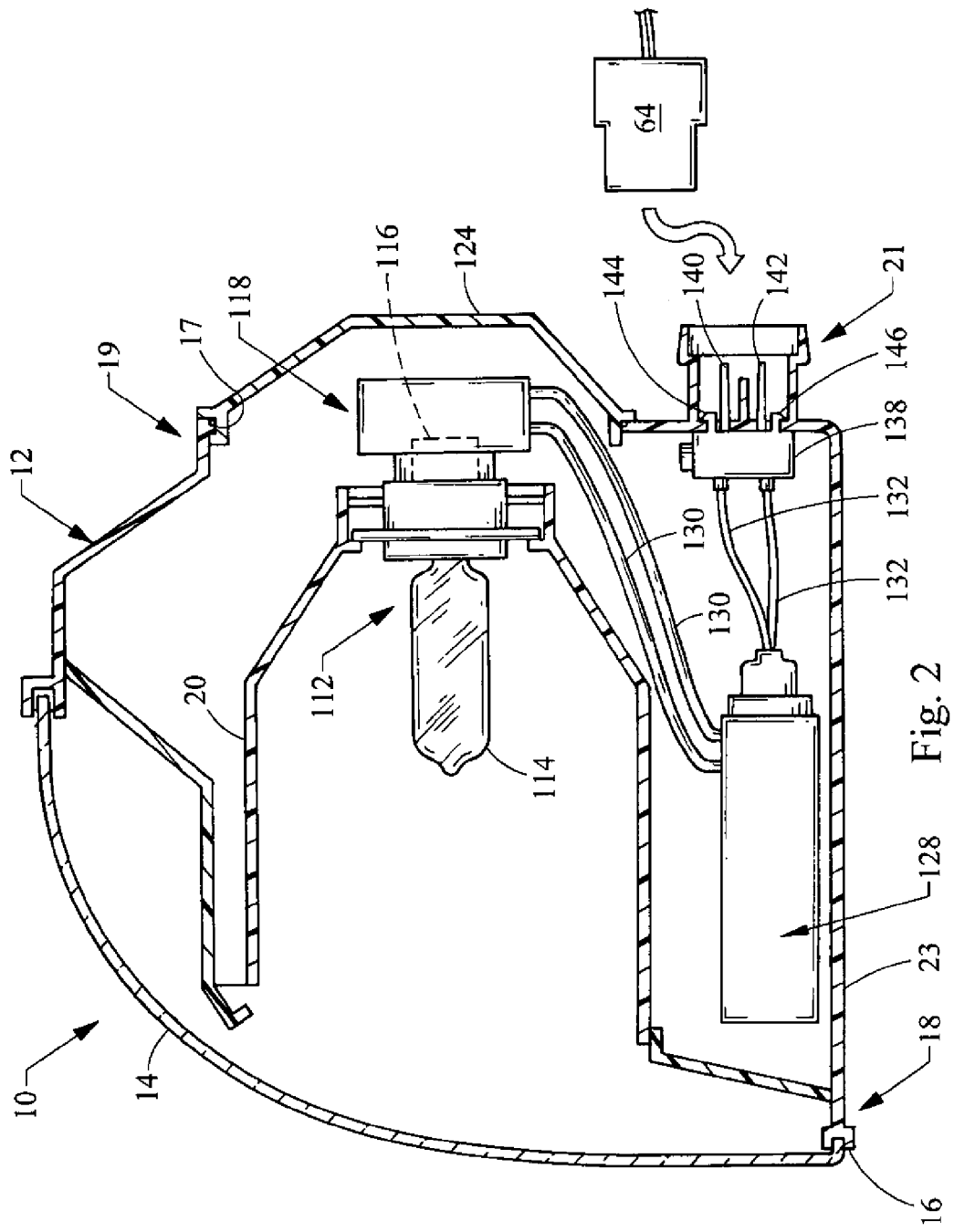
FIG. 2 is a cross-sectional view of the headlamp seen in FIG. 1 employing a HID lamp.

FIG. 2 depicts a cross-sectional view of the vehicle headlamp 10 utilizing a HID lamp 112 according to the present invention. The construction of the headlamp 10 may be generally the same as with the prior embodiment except for the connecting of the lamp 112 to the vehicle power supply. For this reason, the prior discussion regarding the housing 12, lens 14 and reflector 20 is not repeated and the reader's attention is directed to the prior sections hereof where those elements are discussed. It is noted, however, that configuration of the reflector 20 and dimensions of the headlamp 10 may be altered as desired or required for use with the HID lamp 112. The discharge lamp 112 thus includes a discharge bulb 114 and a lamp base 116 and is mounted on the reflector 20.

Since different power requirements are needed for the HID lamp 112, a lighting circuit unit 128 is provided in the lamp housing 12 for igniting the discharge bulb 114. The lighting circuit unit 128 includes an electrical circuit constructed by a converter, an inverter, an igniter and the like and is only generally shown in the drawings. The converter will increase the direct-current (DC) voltage from the vehicle's battery, and the inverter converts the DC voltage to an alternating-current (AC) voltage. The igniter is the starting circuit for generating the high voltage required for initially lighting the HID lamp 112. The lighting circuit unit 128 supplies its high voltage to the HID lamp 112 through one or more high voltage power supply lines 130, which are electrically connected in a lamp socket 118 of the HID lamp 112.

Power supply lines 132 extend from the lighting circuit unit 128 and, at its end, includes a power supply connector 138. The cord connector 138 is designed to replicate features of the wiring harness receptacle 35. In particular, the cord connector 138 includes electrical contact terminals 140 and 142. The contact terminals 140 extend through the apertures 70 and 72 formed in the closed end 68 of the secondary receptacle 21 of the lamp housing and are positioned on opposite sides of the locating feature 73. Latching tabs 144 and 146 extend from the connector 138, adjacent to the terminals 140 and 142, and are configured to secure the cord connector 138 relative to the secondary receptacle 21. The tabs 144 and 146 also extend through the apertures 70 and 72 and may include locking features or shoulders to aid in retaining the connector 138 relative to secondary receptacle 21.

Accordingly, a wire harness connector 64 connects through secondary receptacle 21 and provides power from the vehicle power supply via the contact terminals 140 and 142 to the lighting circuit unit 128. The lighting circuit unit 128 thereafter supplies a high voltage power to a lamp socket 118 connected to the HID lamp 112.

If desired, a rear cover plate 124 may be removable provided over the opening 17 in the rear end 19 of the housing 12 to allow access and replacement of the lamp 112.

As seen in FIGS. 1 and 2, the geometry of the wire harness receptacle 35 and the secondary receptacle 21 is the same and allows the wire harness connector 64 to be compatible with both, thus permitting the halogen headlamp version and the discharge headlamp version of the assembly 10.

Alternative embodiments other than those described above may be used with the present invention. It is therefore intended that the foregoing detailed description be regarded as illustrative rather than limiting, and that it be understood that it is the following claims, including all equivalents, that are intended to define the spirit and scope of this invention.

What is claimed is:

1. A vehicle headlamp unit for connecting to a wire harness connector coupled to a vehicle power supply, the headlamp unit comprising:

a lamp housing defining a central chamber, the lamp housing also having a front end defining a front end opening and a rear end defining a rear end opening;

a lens coupled to the housing and extending over the front end opening;

a reflector mounted within the central chamber for reflecting light from the headlamp unit through the lens;

a lamp supported within the reflector;

a lamp socket electrically connected to the lamp, the lamp socket including a wire harness receptacle having a first configuration, the first configuration being configured to matingly engage and retain the wire harness connector; and a secondary receptacle connected to the housing, the secondary receptacle having a second configuration, the second configuration at least partially duplicating the first configuration and being configured to matingly engage and retain the wire harness connector;

whereby both the wire harness receptacle and the secondary receptacle are configured to alternately receive, matingly engage and retain the wire harness connector.

2. The vehicle headlamp unit of claim 1 wherein the lamp is a halogen lamp.

3. The vehicle headlamp unit of claim 1 wherein the lamp is a high intensity discharge (HID) lamp.

4. The vehicle headlamp unit of claim 3 further comprising a lighting circuit unit, the lighting circuit unit being electrically connected to the HID lamp and configured to light the HID lamp.

5. The vehicle headlamp unit of claim 4 wherein the lighting circuit unit includes a lamp socket and a power supply connector, the lamp socket being electrically connected to the HID lamp and the power supply connector being coupled to the secondary receptacle.

6. The vehicle headlamp unit of claim 5 wherein the power supply connector is connected to the housing and located adjacent to the secondary receptacle.

7. The vehicle headlamp unit of claim 6 wherein the power supply connector is releasably connected to the housing.

8. The vehicle headlamp unit of claim 6 wherein the power supply connector includes electrical contacts extending through the housing and into the secondary receptacle, wherein the electrical contacts are configured to electrically engage contacts of the wire harness connector when the wire harness connector is engaged with the secondary receptacle.

9. The vehicle headlamp unit of claim 3 wherein the lighting circuit unit is located within the housing.

10. The vehicle headlamp unit of claim 1 wherein the secondary receptacle is unitarily formed with the housing.

\* \* \* \* \*

UNITED STATES PATENT AND TRADEMARK OFFICE
CERTIFICATE OF CORRECTION

| | | |
|---|---|---|
| PATENT NO. | : 7,476,014 B2 | Page 1 of 1 |
| APPLICATION NO. | : 11/840451 | |
| DATED | : January 13, 2009 | |
| INVENTOR(S) | : Stephen D. McCarthy et al. | |

It is certified that error appears in the above-identified patent and that said Letters Patent is hereby corrected as shown below:

On the Title Page

In item (75), before "Dennis" delete "Steven" and substitute --Stephen-- in its place.

In item (75), after "Scott William Nicol", delete "Ontario" and substitute --LaSalle, ON-- in its place.

Signed and Sealed this

Nineteenth Day of May, 2009

JOHN DOLL
*Acting Director of the United States Patent and Trademark Office*